(12) United States Patent
Chiang

(10) Patent No.: US 10,909,056 B2
(45) Date of Patent: Feb. 2, 2021

(54) MULTI-CORE ELECTRONIC SYSTEM

(71) Applicant: VIA Technologies, Inc., New Taipei (TW)

(72) Inventor: Wen-Pin Chiang, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 16/231,420

(22) Filed: Dec. 22, 2018

(65) Prior Publication Data

US 2020/0097423 A1    Mar. 26, 2020

(30) Foreign Application Priority Data

Sep. 20, 2018   (TW) .............................. 107133255 A

(51) Int. Cl.
*G06F 13/28*      (2006.01)
*G06F 15/78*      (2006.01)
*G06F 13/40*      (2006.01)

(52) U.S. Cl.
CPC .............. *G06F 13/28* (2013.01); *G06F 13/40* (2013.01); *G06F 15/7807* (2013.01); *G06F 15/7839* (2013.01)

(58) Field of Classification Search
CPC ...... G06F 13/28; G06F 13/40; G06F 15/7807; G06F 15/7839
See application file for complete search history.

(56) References Cited

U.S. PATENT DOCUMENTS

| | | | | |
|---|---|---|---|---|
| 6,233,221 B1* | 5/2001 | Lowe | ...................... | H04J 3/085 370/222 |
| 7,274,706 B1* | 9/2007 | Nguyen | .................. | H04L 12/56 370/419 |
| 2003/0095556 A1* | 5/2003 | Horie | ...................... | G06F 13/28 370/405 |
| 2003/0172189 A1* | 9/2003 | Greenblat | ............... | G06F 15/78 709/251 |
| 2009/0119526 A1* | 5/2009 | Liu | ........................ | G06F 1/3228 713/323 |
| 2014/0122560 A1* | 5/2014 | Ramey | .............. | G06F 15/17312 709/201 |

FOREIGN PATENT DOCUMENTS

WO        2018119778        7/2018

OTHER PUBLICATIONS

"Office Action of Taiwan Counterpart Application," dated Nov. 7, 2019, p. 1-p. 5.

* cited by examiner

*Primary Examiner* — Henry Tsai
*Assistant Examiner* — John B Roche
(74) *Attorney, Agent, or Firm* — JCIPRNET

(57) ABSTRACT

An architecture of a multi-core electronic system is provided. The architecture includes a plurality of first computing cores, a first ring bus, a direct memory access (DMA) engine, and a DMA ring controller. The first computing cores are connected to the first ring bus. The DMA ring controller connects the DMA engine to the first ring bus. The first computing cores communicate with the DMA engine through the first ring bus and make the DMA engine perform a memory operation.

11 Claims, 4 Drawing Sheets

MULTI-CORE ELECTRONIC SYSTEM

CROSS-REFERENCE TO RELATED APPLICATION

This application claims the priority benefit of Taiwan application serial no. 107133255, filed on Sep. 20, 2018. The entirety of the above-mentioned patent application is hereby incorporated by reference herein and made a part of this specification.

BACKGROUND OF THE DISCLOSURE

1. Field of the Disclosure

The disclosure relates to a multi-core system, and more particularly, relates to a multi-core electronic system provided with a direct memory access (DMA) engine.

2. Description of Related Art

Currently, mainstream central processing units (CPUs) are usually adapted with multiple computing cores. In order to exchange information between these computing cores at high transfer speed, many types of on-chip buses have been developed to deliver serial communication among these computing cores. Ring bus is one of the on-chip buses commonly used in CPUs to allow these computing cores to pass data between each other using a variety of ring stops respectively electrically connected to corresponding components.

On the other hand, direct memory access (DMA) is mainly used to transmit data, thereby reducing the loading on the CPUs. A DMA controller can access/transmit data in the storage device according to a previous instruction of the CPU without the assistance of the CPU, and notify the CPU after accessing/transmitting the data. Therefore, DMA is very important in a role of the current computer system.

At present, there is a lack of integration between the on-chip bus technology and the DMA technology. Therefore, how to use an on-chip bus with a DMA controller to allow a CPU to run more smoothly at high speed is a research direction.

SUMMARY OF THE DISCLOSURE

The disclosure provides an architecture of a multi-core electronic system, which may improve the work efficiency of a DMA engine configured on an on-chip ring bus architecture, and speed up communication between the DMA engine and each computing core in the multi-core electronic system.

The multi-core electronic system of the disclosure includes a plurality of first computing cores, a first ring bus, a DMA engine, and a DMA ring controller. The first computing cores are electrically connected to the first ring bus. The DMA ring controller electrically connects the DMA engine to the first ring bus. The first computing cores communicate with the DMA engine through the first ring bus and make the DMA engine perform a memory operation.

Based on the above, according to the architecture of the multi-core electronic system provided in the embodiments of the disclosure, the DMA engine is configured on the ring bus, and the DMA ring controller for allowing the DMA engine to access data on the ring bus is additionally configured. In this way, each of the computing cores can quickly access the DMA engine on the ring bus to directly send related instructions of the memory operation to the DMA engine. Moreover, communication between the DMA engine and the dynamic random access memory (DRAM) configured on the ring bus may also be smoother. In other words, a DMA cycle of the memory operation may be processed more quickly.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
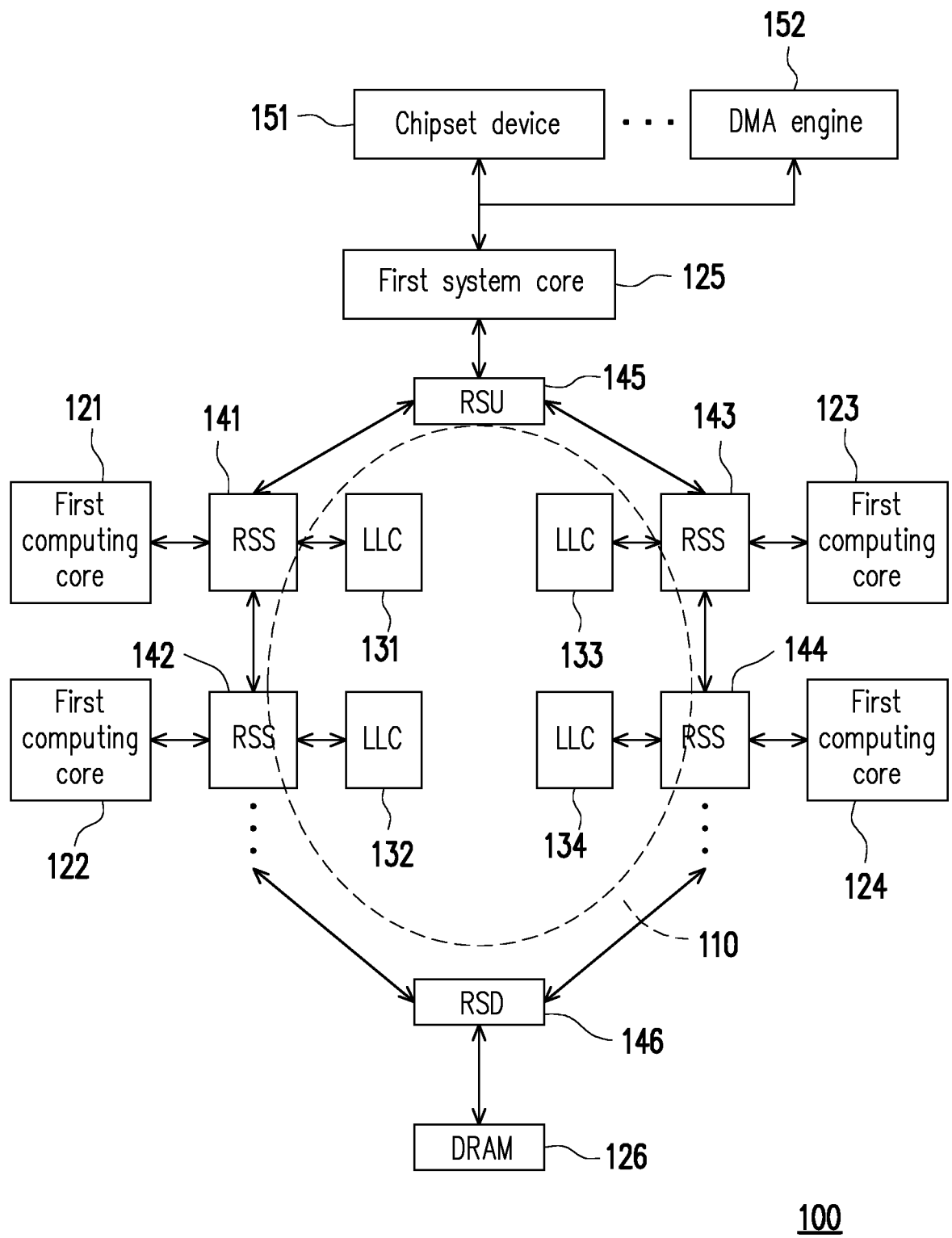
FIG. 1 is schematic diagram of an architecture of a multi-core electronic system.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is schematic diagram of an architecture 100 of a multi-core electronic system. The architecture 100 of the multi-core electronic system may be an internal architecture of a CPU in an electronic system/multi-core electronic system. The architecture 100 uses a ring bus 110 as its main architecture in this embodiment. The architecture 100 in FIG. 1 includes a plurality of ring stops and a plurality of components electrically connected with the ring stops.

The ring stops of this embodiment may also be referred to as ring controllers. The components electrically connected with the ring stops/the ring controllers in FIG. 1 are first computing cores 121 to 124, a first system core (also known as uncore) 125 and a first dynamic random access memory (DRAM) 126. The first computing cores 121 to 124 include processing components for instruction executions. For example, the first computing cores 121 to 124 may include an arithmetic logic unit (ALU), a floating point unit (FPU), an L1 cache, an L2 cache, an L3 cache, etc. These components primarily communicate with one another by using the ring stops 141 to 146. The function of the ring stops 141 to 146 is to allow the components electrically connected to the ring stops 141 to 146 for communicating with other components on other ring stops on the ring bus 110. FIG. 1 includes many types of ring stops. For example, ring-stop-slice modules (RSS) 141 to 144 are electrically connected to the first computing cores 121 to 124 respectively, and ring-stop-slice modules (RSS) 141 to 144 are electrically connected to the last-level cache (LLC) memories 131 to 134 respectively. A ring-stop-uncore module (RSU) 145 is electrically connected to the first system core 125, and a ring-stop-dram module (RSD) 146 is electrically connected to the DRAM 126. The RSS 141 to 144, the RSU 145, and the RSD 146 are all different types of ring stops.

If a particular component (e.g. the first computing core 121 or the first DRAM 126) transmits a data packet on the ring bus 110, the particular component would transmit the data packet to the corresponding ring stop. The ring stop then arbitrates for access to the ring bus 110 and sends the data packet to an adjacent ring stop in a preferred travelling direction. For example, to transmit a data packet to the first DRAM 126, the first computing core 121 (as the particular component) would transmit the data packet to the ring stop RSS 141. Then, the ring stop RSS 141 transmits the data packet onto the ring bus 110 using an arbitration mechanism of the ring bus 110. The RSS 141 selects a travelling direction of the data packet to forward the data packet toward the ring stop RSD 146. To receive the data packet from the other ring stop, the ring stop RSD 146 first checks whether header information (e.g., DstID) of the data packet matches the corresponding component (e.g. first DRAM 126) of the ring stop RSD 146. If the header information matches, the ring stop RSD 146 takes the data packet out from the ring bus 110 to transmit the data packet to the first DRAM 126 for subsequent processing. In contrast, if the header information does not match, the ring stop RSD 146 continues to pass the data packet to the next ring stop in the original travelling direction.

The first system core 125 may serve as a traffic agent for a plurality of chipset devices 151 electrically connected to the electronic system. The first system core 125 is configured to allow the RSU 145 to communicate with the chipset devices 151. From another perspective, in addition to the CPU, the electronic system further includes the chipset devices 151, such as an Intel QuickPath Interconnect (QPI) controller, a Thunderbolt controller, a PCI-E controller, a SPI controller, a graphic processing unit (GPU), an additional DRAM, a DMA engine 152, etc. In other words, the DMA engine 152 also belongs to one of the chipset devices 151. To transmit the data packet to the CPU, before the data packet may enter the ring bus 110 through the ring stop RSU 145, the chipset device 151 and the DMA engine 152 need to arbitrate in an upstream cycle (also known as P2C) through the first system core 125 so as to obtain a bandwidth to access the ring bus 110.

Based on the architecture 100 in FIG. 1, if the first computing cores 121 to 124 perform a memory operation by using the DMA engine 152, the corresponding instruction may only be issued through the ring stop RSU 145 and the first system core 125. When processing the memory operation from the first computing cores 121 to 124, the DMA engine 152 needs to perform the corresponding memory operation on the DRAM 126 through the first system core 125. After the memory operation is completed, the DMA engine 152 needs to notify the corresponding first computing cores 121 to 124 that the DMA cycle of the entire memory operation is completed by an interrupt through the first system core 125. In other words, the reasons why the efficiency of the DMA engine 152 in performing the memory operation was not improving may include at least the following two reasons. Those reasons are: (1) the DMA engine 152 needs to compete with the other chipset devices 151 for the bandwidth to the ring bus 110; and (2) the DMA engine 152 is unable to establish a fast information exchange path with the first computing cores 121 to 124. Therefore, the architecture 100 in FIG. 1 would severely affect the performance of the DMA engine 152 in performing the memory operation.

Therefore, in the architecture of the multi-core electronic system according to the following embodiments of the disclosure, the DMA engine is electrically and directly connected the ring bus as one of the components through a controller (such as DMA ring controller). Also, a DMA ring controller for allowing the DMA engine to access the data packet on the ring bus is also additionally configured. In this way, each of the computing cores electrically connected to the ring bus can quickly use the ring bus to directly transmit related instructions of the memory operation to share the DMA engine. The performance of the DMA engine may also be improved accordingly. That is to say, the DMA engine electrically connected to the ring bus no longer needs to compete the bandwidth with the other chipset devices outside the ring bus. As a result, the performance of the DMA engine electrically connected to the ring bus would be better than the performance of the DMA engine at the chipset device level that needs to be arbitrated by the system core before forwarding the data packet.

Figure 2:
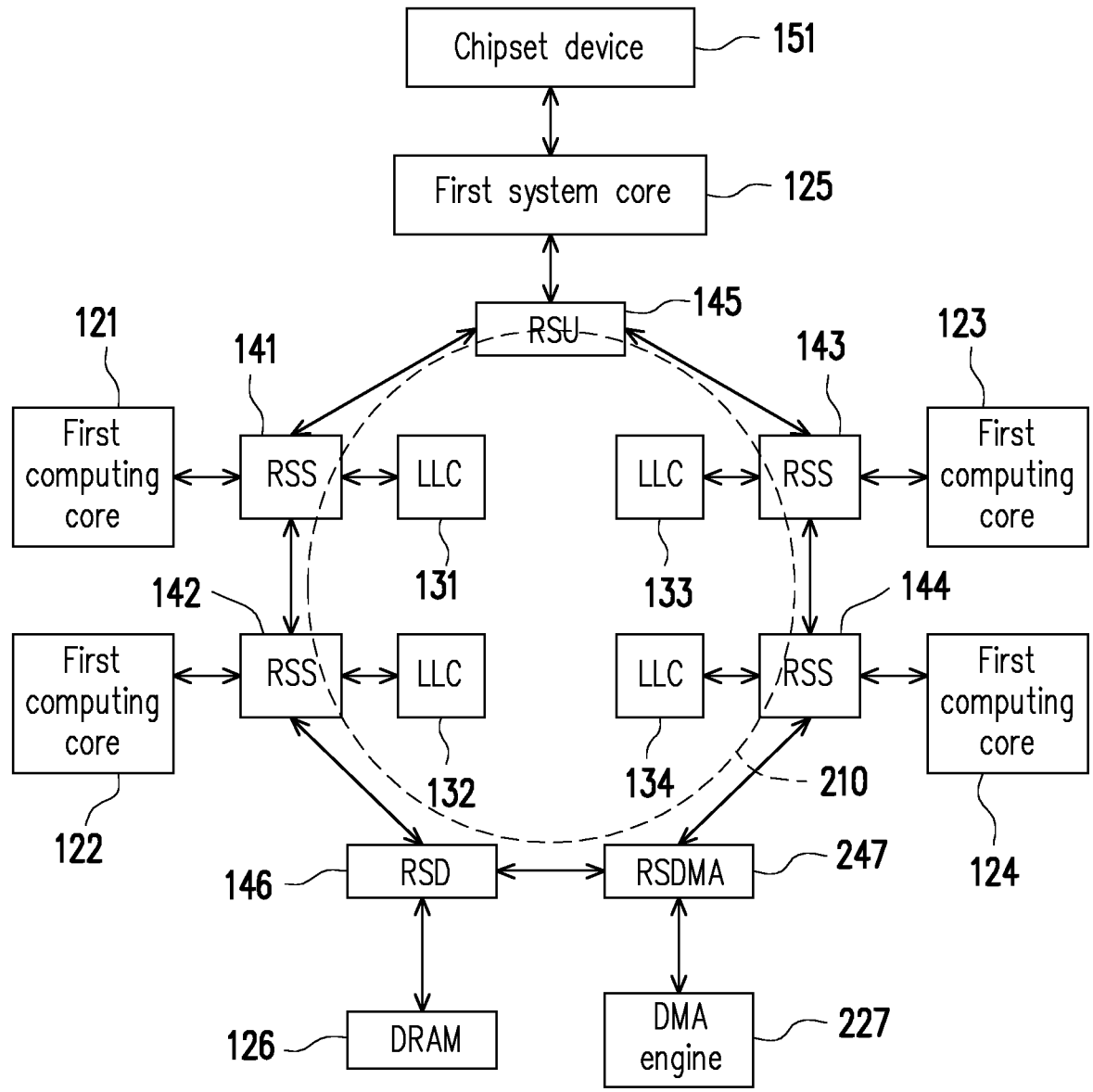
FIG. 2 is a schematic diagram of an architecture of a multi-core electronic system according to a first embodiment of the disclosure.

FIG. 2 is a schematic diagram of an architecture 200 of a multi-core electronic system according to a first embodiment of the disclosure. The architecture 200 in FIG. 2 mainly includes a plurality of first computing cores 121 to 124, a first ring bus 210, a direct memory access (DMA) engine 227, and a DMA ring controller 247. In this embodiment, four first computing cores (121 to 124) are used as an example. Those who apply the embodiment may increase the number of computing cores based on actual requirements, and may even electrically connect more ring buses together (which will be described in the subsequent embodiment) for electrically connecting more computing cores. The first computing cores 121 to 124 are electrically connected to the first ring bus 210 through the first computing core ring controllers 141 to 144 respectively. The DMA ring controller 247 may also be referred to as a ring stop DMA module (RSDMA) 247 in this embodiment. The DMA ring controller 247 dedicated to the DMA engine 227 can directly handle requests from the other ring stops and responds to the requests as similar to the other ring stops. In other words, the ring stop RSDMA 247 can transmit a memory operation of the DMA engine 227 as a data packet on the first ring bus 210 to the other ring stops, and can obtain data packets transmitted by the other ring stops from the first ring bus 210.

The architecture 200 in FIG. 2 further includes a first DRAM 126, a first DRAM ring controller 146 (also referred to as a ring stop DRAM (RSD) 146), a plurality of first computing core ring controllers 141 to 144 (also referred to as ring-stop-slice (RSS) modules 141 to 144), a plurality of first last-level cache (LLC) memories 131 to 134, a first system core (also referred to as uncore) 125 and a first system core ring controller 145 (also referred to as a ring-stop-uncore module (RSU) 145). The first DRAM 126 and the first DRAM ring controller 146 of this embodiment are electrically connected with the first ring bus 210 of the architecture 200. The first DRAM ring controller 146 is configured to electrically connect the first DRAM 126 to the first ring bus 210.

The chipset device 151 in FIG. 2 may also be referred to as a first chipset device. Other than configuring one first DRAM 126 on the first ring bus 210, those who apply the embodiment may also add other DRAMs (not shown) on the first ring bus 210. In other words, although one single first DRAM 126 is used as an example in this embodiment, those who apply the embodiment may adjust the number of the first DRAMs 126 and the number of the corresponding first DRAM ring controllers 146 based on actual requirements. In certain embodiments, the DRAM may also be configured to the chipset device 151 outside the first ring bus 210. The DMA engine 227 can perform the memory operation on the DRAMs according instructions of the first computing cores 121 to 124.

On the other hand, in order to facilitate the DMA engine 227 to perform the memory operation, the ring stop RSDMA 247 of this embodiment may be configured closer in space to the ring stop RSD 146, but not limited thereto. By doing so, the data packet transmits to the first DRAM 126 by the DMA engine 227 may be obtained more quickly. A processing result of the memory operation may also be obtained by the DMA engine 227 from the first DRAM 126 more quickly.

The first computing core ring controllers (ring stops RSS) 141 to 144 of the embodiment are electrically connected to the first computing cores 121 to 124 respectively. The corresponding first computing cores 121 to 124 are configured to the first ring bus 210 by the ring stops RSS 141 to 144 respectively. First last-level cache memories 131 to 134 are also respectively configured to the ring stops RSS 141 to 144 corresponding thereto, wherein each of the first last-level cache memories 131 to 134 provides data accessing to the corresponding first computing cores 121 to 124.

The first system core 125 electrically connects to the first ring bus 210 through the first system core ring controller (ring stop RSU) 145. The first system core 125 is electrically connected to one or more chipset devices 151 in the multi-core electronic system, so as to allow one or more chipset devices 151 and the first computing cores 121 to 124 to communicate with each other. It is also possible that the chipset device 151 of this embodiment to not include the DMA engine. In other words, the DMA engine 227 of this embodiment can be electrically connected to the first computing cores 121 to 124 by using the first ring bus 210, rather than going through the first system core 125 and the first system core ring controller 145. In addition to electrically connecting to one or more chipset devices 151, the first system core 125 can also be electrically connected to an L3 cache (not shown) and includes the snooping pipeline function for monitoring cache coherence.

In particular, the DMA engine 227 in FIG. 2 is directly configured to the first ring bus 210 of the architecture 200. In other words, the DMA engine 227 is electrically connected to the first ring bus 210 through the DMA ring controller 247. The first computing cores 121 to 124 can then communicate with the DMA engine 227 through the first ring bus 210 and make the DMA engine 227 perform the memory operation for the first DRAM 126 and/or other memories. The so-called "memory operation" may be operating modes performed on the first DRAM 126 or other DRAMs, such as reading, writing, copying, comparing, etc.

Here, an example is given to illustrate how one of the first computing cores 121 to 124 (e.g., the first computing core 121) uses the DMA engine 227 to perform the memory operation for the first DRAM 126. When the first computing core 121 needs to perform the memory operation by using the DMA engine 227, the first computing core 121 needs to prepare necessary resources in advance so the DMA engine 227 can continue to work. For example, the first computing core 121 needs to prepare information like a PCI configuration space, a memory-mapped I/O (MMIO) resource, an interrupt path (which can be electrically connected to the chipsets for generating an Interrupted/MSI (Modified-Shared-Invalid) protocol) as an initialization phase for the DMA engine 227.

After the initialization phase, the first computing core 121 generates a DMA request as a data packet and transmits that data packet on the first ring bus 210 through the ring stop RSS 141. Then, the data packet would be delivered from the ring stop RSS 141 of the first computing core 121 sequentially through the ring stop RSS 142, the ring stop RSD 146 and the ring stop RSDMA 247 to the DMA engine 227 in the selected travelling direction. After receiving the data packet served as the DMA request, the DMA engine 227 uses the information of the memory operation as a data packet so the ring stop RSDMA 247 can pass that data packet corresponding to the memory operation to the ring stop RSD 146. The ring stop RSD 146 and the first DRAM 126 transmit a data processing result to the DMA engine 227 through the ring stop RSDMA 247 based on a corresponding memory operation (e.g., reading/writing/copying/comparing operations, etc.) in the data packet. After receiving the data processing result, the DMA engine 227 provides the data processing result (data packet) by the interrupt sequentially through the ring stop RSDMA 247, the ring stop RSD 146 and the ring stop RS S 142 to the first computing core 121. The data packet can inform the first computing core 121 of a completion result of the memory operation. Accordingly, one DMA cycle of the memory operation can be completed.

In other embodiments, it is also possible to configure a plurality of DMA engines 227 and a plurality of ring stops RSDMA 247 to the first ring bus 210 to allow the first computing cores 121 to 124 to share those DMA engines 227. As another advantage, the DMA engine 227 includes a buffer for recording data after the memory operation is completed. The buffer may also be detected by the first system core 125 using a snooping function for monitoring cache coherence. In this way, if the data is buffered in the DMA engine 227, the latency of cache coherence may be reduced.

Figure 3:
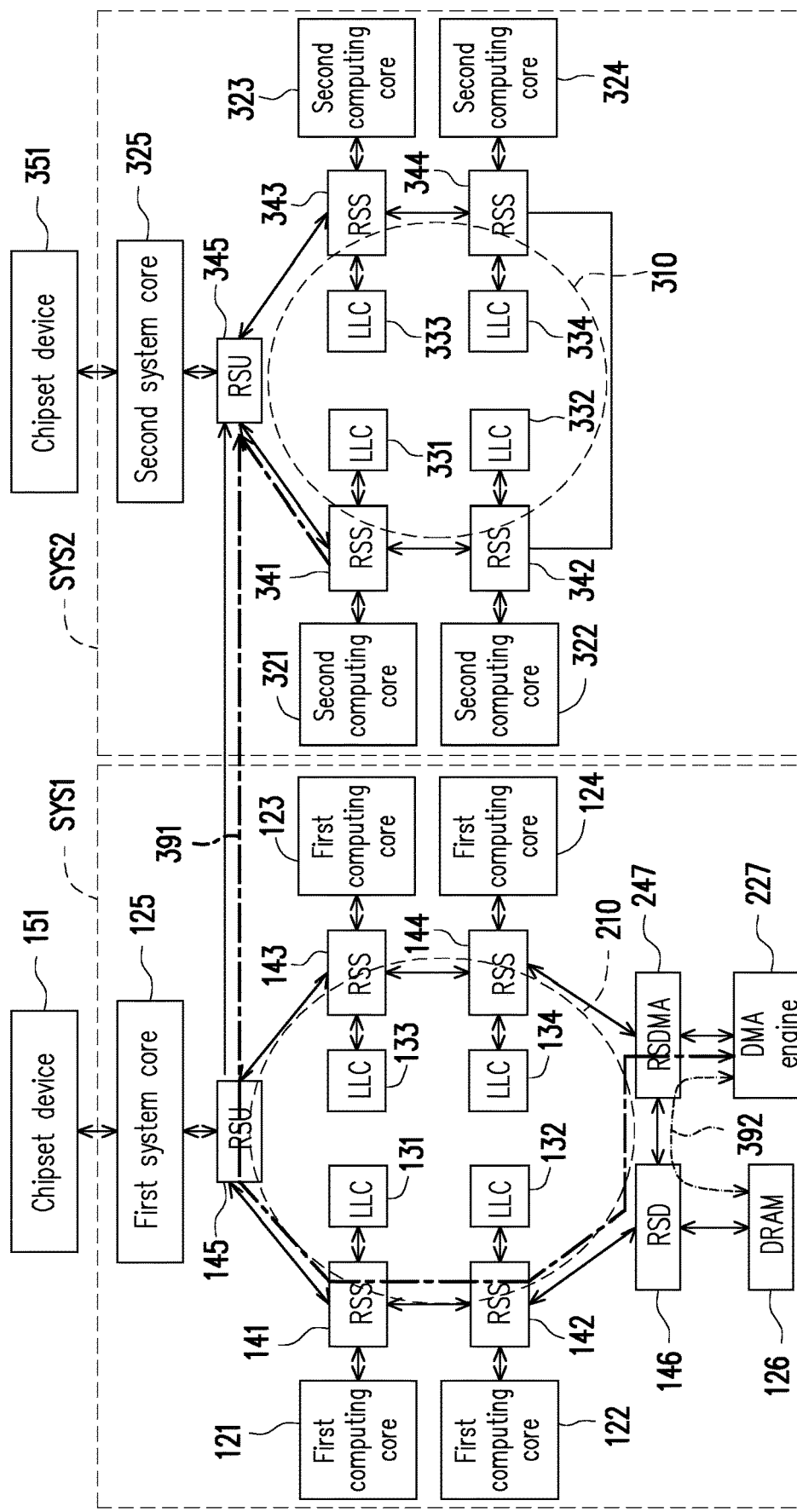
FIG. 3 is a schematic diagram of an architecture of a multi-core electronic system according to a second embodiment of the disclosure.

In this embodiment, the multi-core electronic system may also include a plurality of ring buses, and all the computing cores configured to the different ring buses can share the same DMA engine in this embodiment of the disclosure. FIG. 3 is a schematic diagram of an architecture 300 of a multi-core electronic system according to a second embodiment of the disclosure. The architecture 300 of the multi-core electronic system in the second embodiment includes a first ring bus 210 and a second ring bus 310. A plurality of ring stops and related components configured to the first ring bus 210 are all identical to the components described in the foregoing embodiment of FIG. 2. In addition to the ring stops and the related components configured to the first ring bus 210, the architecture 300 further includes a plurality of ring stops and related components configured to the second bus ring 310. In detail, the architecture 300 further includes the second ring bus 310, a plurality of second computing cores 321 to 324, a plurality of ring stops RSS 341 to 344 and a plurality of second last-level cache (LLC) memories 331 to 334 corresponding to the second computing cores 321 to 324, and a second system core ring controller (ring stop RSU) 345 that electrically connects to the second system core 325 and the second ring bus 310. The second system core 325 may be used to allow the second system core ring controller RSU 345 to communicate with at least one chipset device 351. The chipset device 351 may also be referred to as a second chipset device. The second last-level cache memories 331 to 334 are electrically connected to the second computing core ring controllers (ring stops RSS) 341 to 344 respectively. The second system core ring controller RSU 345 and the first system core ring controller RSU 145 communicate with each other. Accordingly, the first computing cores 121 to 124 and/or the second computing cores 321 to 324 can all communicate with the same DMA engine 227 through the second ring bus 310 and the first ring bus 210 and make the DMA engine 227 perform the memory operation.

In this embodiment, first ring stops (i.e., RSS 141 to 144, RSU 145, RSD 146 and RSDMA 247) and the corresponding components (i.e., the first computing cores 121 to 124, the first system core 125, the first DRAM 126 and the DMA engine 227) on the first ring bus 210 are referred as a first system SYS1. Second ring stops (i.e., RSS 341 to 344 and RSU 345) and the corresponding components (i.e., the second computing cores 321 to 324 and the second system core 325) on the second ring bus 310 are referred as a second system SYS2. In this embodiment, the first system SYS1 may be configured to one system chip, and the second system SYS2 may be configured to another system chip. The two system chips can communicate with each other through the second system core ring controller RSU 345 and the first system core ring controller RSU 145 through the QPI bus and/or the PCIe bus for example. In other embodiments, the first system SYS1 and the second system SYS2 may be configured to the same system chip. Those who apply the embodiment may decide whether to have the system SYS1 and the second system SYS2 configured to in the same system chip.

In particular, the DMA engine is not configured on the second ring bus 310 in the second system SYS2. Alternatively, in order to communicate with the components in the second ring bus 310, the DMA engine electrically connected to the second system SYS2 needs to go through the second system core 325. Accordingly, since the first ring bus 210 and the second ring bus 310 are electrically connected to each other, the second computing cores 321 to 324 can perform the memory operation by using the DMA engine 227 in the first ring bus 210, instead of using a DMA engine electrically connected to the second system SYS2.

Here, an example is given to illustrate how one of the second computing cores 321 to 324 (e.g., the second computing core 321) uses the DMA engine 227 to perform the memory operation on the first DRAM 126. The second computing core 321 takes related information served as the DMA request to generate the DMA request as a data packet, and transmits that data packet into the second ring bus 310 through the second ring stop RSS 341. The data packet would be delivered from the second ring stop RSS 341 sequentially through the second ring stop RSU 345, the first ring stop RSU 145, the first ring stop RSS 141, the first ring stop RSS 142, the first ring stop RSD 146 and the first ring stop RSDMA 247 to the DMA engine 227 in the selected travelling direction as shown by an arrow 391 in FIG. 3. After receiving the data packet served as the DMA request, the DMA engine 227 uses the information of the memory operation as a data packet so the first ring stop RSDMA 247 can transmit the data packet corresponding to the memory operation to the first ring stop RSD 146. The first ring stop RSD 146 and the first DRAM 126 transmit a data processing result to the DMA engine 227 through the first ring stop RSDMA 247 based on a corresponding DRAM memory operation in the data packet. The memory operation between the DMA engine 227 and the first DRAM 126 is shown by an arrow 392. After receiving the data processing result, the DMA engine 227 provides the data processing result (data packet) by the interrupt sequentially through the first ring stop RSDMA 247, the first ring stop RSD 146, the first ring stop RSS 142, the first ring stop RSS 141, the first ring stop RSU 145, the second ring stop RSU 345, and the second ring stop RSS 341 to the second computing core 321 (i.e., in an opposite direction of the arrow 391).

Figure 4:
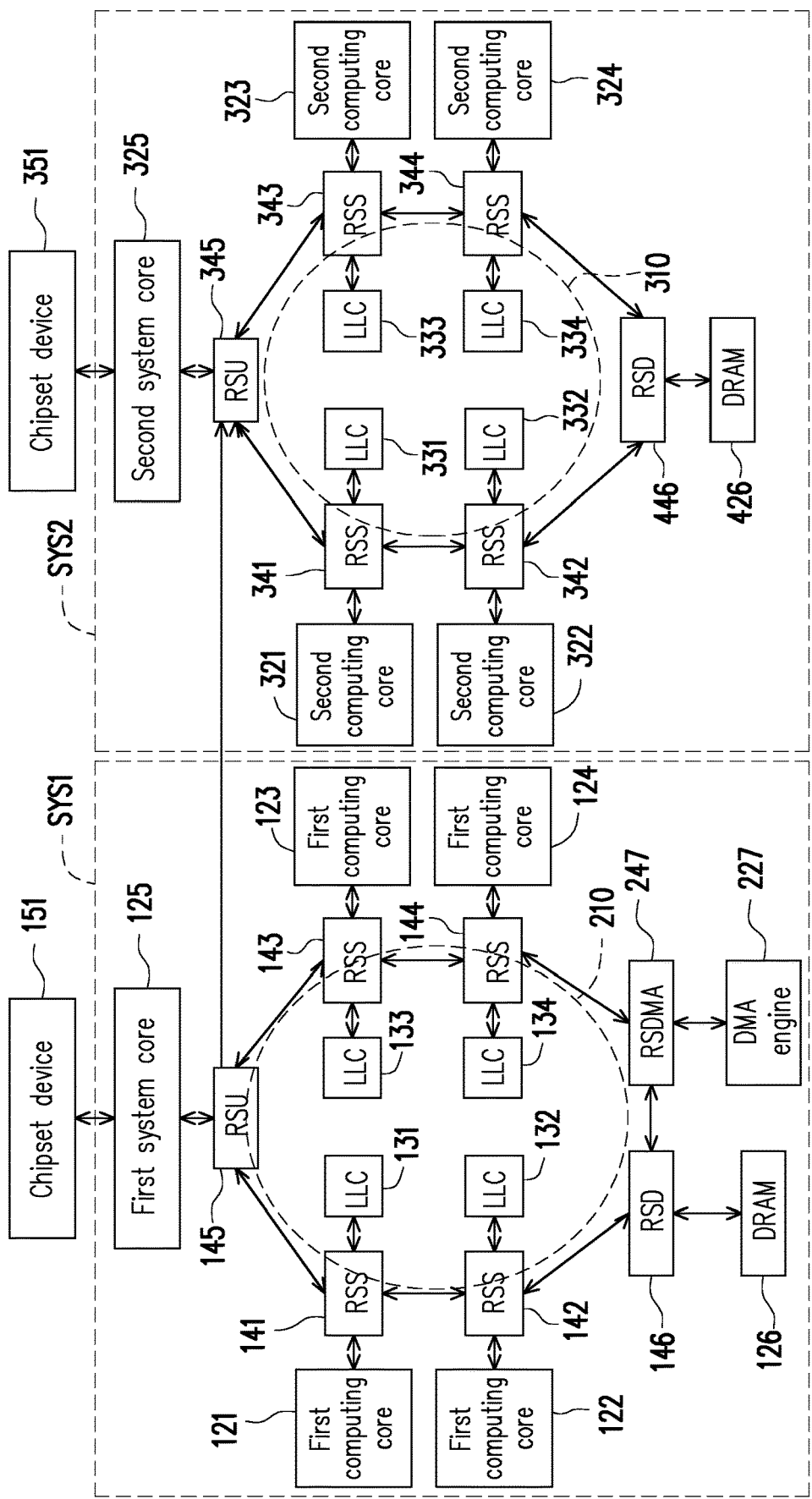
FIG. 4 is a schematic diagram of an architecture of a multi-core electronic system according to a third embodiment of the disclosure.

FIG. 4 is a schematic diagram of an architecture 400 of a multi-core electronic system according to a third embodiment of the disclosure. The difference between FIG. 3 and FIG. 4 is that, in addition to the original ring stops and the corresponding components, the second ring bus 310 of FIG. 4 further includes a second DRAM 426 and a second DRAM ring controller (ring stop RSD) 446. The second DRAM 426 is electrically connected to the second ring bus 310 by the ring stop RSD 446. Accordingly, based on the fact that the first ring bus 210 and the second ring bus 310 are electrically connected to each other, the DMA engine 227 in the first ring bus 210 can perform the memory operation for the second DRAM 426.

In summary, according to the architecture of the multi-core electrical system provided in the embodiments of the disclosure, the DMA engine is configured to the ring bus through the DMA ring controller. The DMA ring controller for allowing the DMA engine to access data on the ring bus is additionally configured. In other words, the DMA engine can be electrically connected to the first computing cores without going through the first system core and the first system core ring controller outside the ring bus. In addition, the DMA engine can be electrically connected to the first computing cores or the second computing cores without going through the first system core, the first system core ring controller, the second system and the second system core ring controller outside the ring bus.

In this way, each of the computing cores can quickly and directly transmit related instructions of the memory operation to the DMA engine through use the DMA engine configured to the ring bus. Further, the communication between the DMA engine and the DRAM through the ring bus may be smoother. In other words, the DMA cycle of the memory operation may be processed more quickly.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A multi-core electronic system, comprising:
a plurality of first computing cores;
a first ring bus, wherein the first computing cores are electrically connected to the first ring bus;
a first system core;
a first system core ring controller, configured to electrically connect the first system core to the first ring bus;
a first dynamic random access memory;
a first dynamic random access memory ring controller, configured to electrically connect the first dynamic random access memory to the first ring bus,
a direct memory access engine; and
a direct memory access ring controller, configured to electrically connect the direct memory access engine to the first ring bus,
wherein the direct memory access engine is electrically connected to the plurality of first computing cores without going through the first system core and the first system core ring controller,
wherein the direct memory access ring controller and the first dynamic random access memory ring controller are located at the first ring bus, and the direct memory access ring controller is different from the first dynamic random access memory ring controller, and wherein the plurality of first computing cores communicate with the direct memory access engine through the first ring bus and make the direct memory access engine perform a memory operation on the first dynamic random access memory directly through the first ring bus without going through the first system core and the first system core ring controller.

2. The multi-core electronic system according to claim 1, further comprising:
a plurality of first computing core ring controllers, wherein each of the first computing core ring controllers is electrically connected to a corresponding first computing core, and each of the first computing core ring controllers electrically connects the corresponding first computing core to the first ring bus.

3. The multi-core electronic system according to claim 2, further comprising:
a plurality of first last-level cache memories, wherein each of the first last-level cache memories is electrically connected to a corresponding first computing core ring controller.

4. The multi-core electronic system according to claim 1, wherein the first system core is configured to communicate with a first chipset device.

5. The multi-core electronic system according to claim 1, further comprising:
a plurality of second computing cores;
a second ring bus, wherein the plurality of second computing cores are electrically connected to the second ring bus;
a second system core; and
a second system core ring controller, configured to electrically connect the second system core to the second ring bus,
wherein the second system core ring controller and the first system core ring controller communicate with each other, and the plurality of second computing cores communicate with the direct memory access engine through the first ring bus and the second ring bus and make the direct memory access engine perform the memory operation.

6. The multi-core electronic system according to claim 5, wherein the second system core is configured to communicate with at least one second chipset device.

7. The multi-core electronic system according to claim 5, wherein the direct memory access engine is electrically connected to the plurality of first computing cores or the plurality of second computing cores without going through the first system core and the second system core.

8. The multi-core electronic system according to claim 5, further comprising:
a second dynamic random access memory; and
a second dynamic random access memory ring controller, configured to electrically connect the second dynamic random access memory to the second ring bus,
wherein the direct memory access engine performs the memory operation on the second dynamic random access memory.

9. The multi-core electronic system according to claim 5, further comprising:
a plurality of second computing core ring controllers, wherein each of the second computing core ring controllers is electrically connected to a corresponding second computing core, and each of the second computing core ring controllers electrically connects the corresponding second computing core to the second ring bus.

10. The multi-core electronic system according to claim 9, further comprising:
a plurality of second last-level cache memories, wherein each of the second last-level cache memories is electrically connected to a corresponding second computing core ring controller.

11. The multi-core electronic system according to claim 5, wherein the plurality of first computing cores, the first ring bus, the direct memory access engine, the direct memory access ring controller, the first system core, the first system core ring controller and the first dynamic random access memory are configured on a first chip, and the plurality of second computing cores, the second ring bus, the second system core and the second system core ring controller are configured on a second chip.

* * * * *